United States Patent [19]

Van Zelderen

[11] 3,889,897

[45] June 17, 1975

[54] COILABLE TAPE MEASURING DEVICE HAVING A SELF-REGULATING SPEED CONTROL MECHANISM

[75] Inventor: Henderik Van Zelderen, St. Avon, Conn.

[73] Assignee: The Stanley Works, New Britain, Conn.

[22] Filed: Sept. 26, 1973

[21] Appl. No.: 401,044

[52] U.S. Cl. .............................................. 242/107.3
[51] Int. Cl. .............................................. B65h 75/48
[58] Field of Search......... 242/107.3, 107.15, 107.6, 242/84.52 C

[56] References Cited
UNITED STATES PATENTS

| | | | |
|---|---|---|---|
| 2,586,386 | 2/1952 | Ryan................................. | 242/107.6 |
| 2,587,652 | 3/1952 | Rostine............................. | 242/107.3 |
| 2,896,912 | 7/1959 | Faugier et al..................... | 242/107.3 |
| 3,318,550 | 5/1967 | Quenot............................. | 242/107.3 |
| 3,332,638 | 7/1967 | Jessup et al...................... | 242/107.3 |
| 3,716,201 | 2/1973 | West................................. | 242/107.3 |

Primary Examiner—Stanley N. Gilreath
Attorney, Agent, or Firm—Prutzman, Hayes, Kalb & Chilton

[57] ABSTRACT

A tape measuring device is provided with a self-regulating recoil speed control comprising a reel rotatably journaled within a casing chamber and having a disc-like side member carrying a pair of pivot posts adjacent its peripheral rim. An annular shoulder on the casing wall extends toward the reel intermediate the rim and the pivot posts and alignably confines the reel within the chamber and limits its transverse movement, the shoulder including an arcuate brake drum surface facing generally toward the pivots. A pair of planar weighted lugs are pivotably mounted on the posts for frictionally engaging the brake drum surface and bearing thereagainst in proportion to the centrifugal force applied to the reel by a power drive recoil spring when returning a measuring blade to its recoiled position within the casing.

4 Claims, 3 Drawing Figures

PATENTED JUN 17 1975 3,889,897
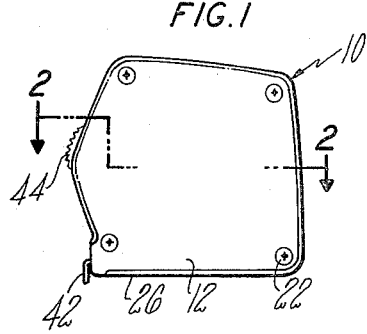
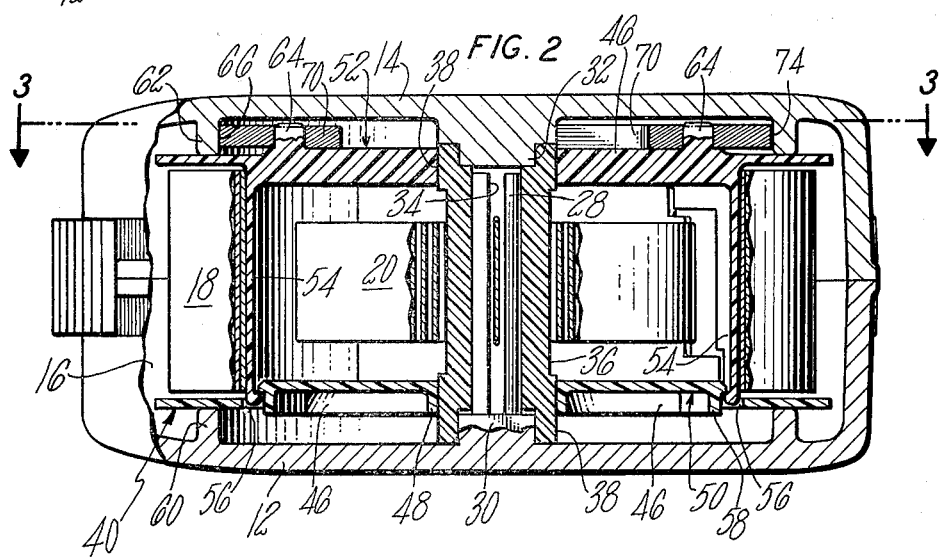
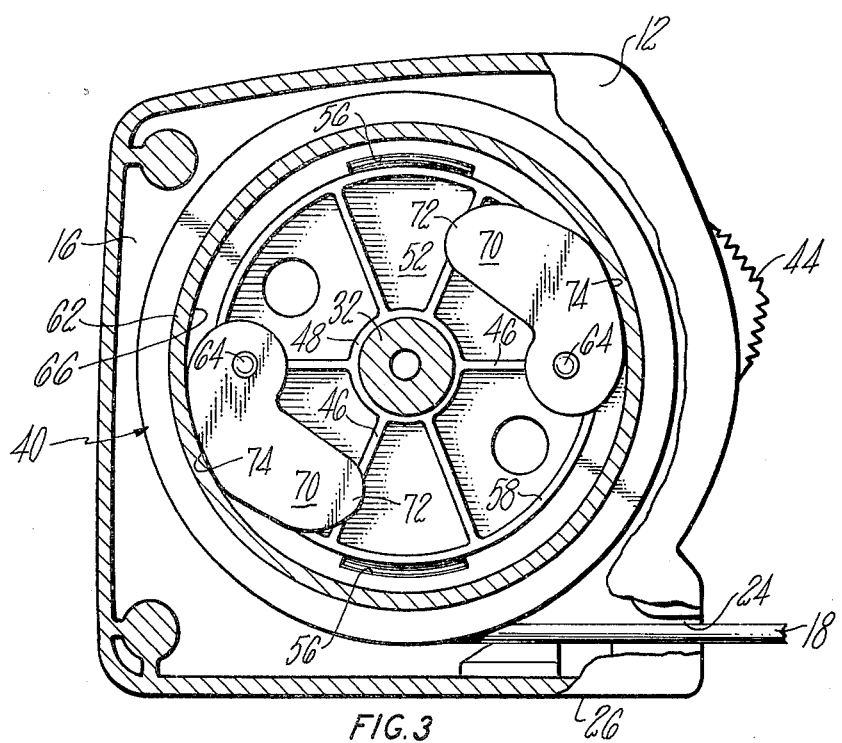

COILABLE TAPE MEASURING DEVICE HAVING A SELF-REGULATING SPEED CONTROL MECHANISM

BACKGROUND AND SUMMARY OF THE INVENTION

The present invention relates generally to measuring devices that utilize a coilable measuring tape and is more particularly directed to a new and improved coilable tape measuring device incorporating a self-regulating speed control mechanism.

Coilable measuring tapes have long included power drive springs for retracting an extended measuring tape or blade and recoiling it within a case. As will be appreciated, the driving force provided by the power spring must be sufficient to fully retract the blade but not so strong as to cause undesirable rebound or other damage to the blade such as stripping the terminal hook from the end thereof. This becomes a particularly acute problem with long measuring blades such as those of about twenty feet in length and longer since the power spring is of sufficient strength to retract the blade at very high speeds. Such speeds may also present a safety hazard to the user as the edge of the blade may contact the users hand during high speed retraction resulting in serious injury.

Accordingly, it is an object of the present invention to provide a new and improved coilable rule having a power drive spring that automatically and rapidly returns the measuring blade to a recoiled position within the rule housing yet prevents excessive recoil speed. Included in this object is the provision for a recoil braking mechanism that operates in proportion to the recoil speed of the rule so as to self-regulate the recoil speed and reduce the possibility of damage to the rule and/or danger to the user.

Another object of the present invention is to provide a coilable tape measuring device of the type described that is particularly well suited to large measuring blades or to tapes having a heavy duty recoil spring without substantially hampering the operation of the recoil spring or requiring an excessively large or bulky mechanism for effecting the braking operation.

Still another object of the present invention is to provide a power retracting measuring tape with a self-regulating speed control to prevent excessive retraction speed while maintaining reliable trouble-free operation in a sturdy, durable and economical construction.

Other objects will be in part obvious and in part pointed out in more detail hereinafter.

These and related objects are accomplished in accordance with the present invention by providing a tape measuring device adapted for self-regulating its recoil speed comprising a casing including spaced apart side walls defining a chamber, a reel rotatably journaled within the chamber, a coiled measuring blade mounted on the reel for rotation, and a power drive spring for driving the measuring blade to its recoiled position within the chamber. The reel includes a pair of spaced apart side members in close confronting relationship with the casing side walls, one of said side members carrying a pivot adjacent but spaced from its peripheral rim. The casing wall confronting the pivot is provided with an annular shoulder extending toward the reel intermediate the rim and the pivot to alignably confine the reel within the chamber and limit its transverse movement. The shoulder includes an arcuate brake drum surface facing generally toward the pivot. A weighted mass is pivotably mounted on the side member at the pivot between the side member and the confronting casing wall for sectionally engaging the brake drum surface. The weighted mass is freely pivotable and bears against the brake drum surface in proportion to the centrifugal force applied to the reel by the power drive spring when returning the measuring blade to its recoiled position to thereby self-regulate the recoil speed of the measuring blade.

A better understanding of the objects, advantages, features, properties and relations of the invention will be obtained from the following detailed description and accompanying drawing which set forth an illustrative embodiment and are indicative of the way in which the principles of the invention are employed.

A BRIEF DESCRIPTION OF THE DRAWING

In the drawing:

FIG. 1 is a side elevational view of a coilable rule embodying the features of the present invention;

FIG. 2 is an enlarged sectional view taken along the line 2—2 of FIG. 1; and

FIG. 3 is a sectional view taken along the line 3—3 of FIG. 2.

DESCRIPTION OF A PREFERRED EMBODIMENT

Referring now to the drawing in greater detail wherein like reference numerals indicate like parts throughout the several figures, a coilable rule embodying the features of the present invention is illustrated as a modification of the rule described in U.S. Pat. No. 3,716,201 and the description of the common features found therein are incorporated herein by reference. The rule is shown comprising a two piece casing 10 including a pair of spaced apart side walls 12 and 14 defining a chamber 16 suitably dimensioned so as to receive a coilable measuring tape or blade 18 and a coiled power drive spring 20 for automatically returning the measuring blade 18 to its recoiled position within the chamber 16 following use. In the particular embodiment shown the two pieces of the casing 10 are secured together by fasteners 22 located at approximately the four corners of the casing and is provided with an opening 24 adjacent its bottom wall 26, the opening 24 communicating with the interior chamber 16 and providing a passageway through which the blade 18 travels as it is drawn by the user to an extended position and automatically retracted by the power coil spring 20 during the recoil operation.

In the particular embodiment used for illustration purposes the side wall 12 has a cylindrical center post 28 projecting inwardly from square base 30 and extending substantially fully across the width of the casing. The post 28 terminates at a location in registry with a square, centrally positioned truncated stud 32 on the interior surface of the opposite side wall 14. The post 28 is bifurcated by an elongated slot 34 suited for anchoring the innermost end of the power drive spring 20. The center post 28 additionally receives a stationary spindle 36 mounted on and between both the post base 30 and stud 32 and cooperating therewith to provide added support to the side walls 12, 14 at the central portion of the casing. The enlarged end portions 38 of the spindle have circular exteriors and, as will be appreciated, the construction described in the aforementioned U.S. Pat. No. 3,716,201 may be easily substituted for the construction described and shown herein.

The coiled measuring blade 18 is directly connected to the coiled power spring 20 but alternatively may be connected to a suitable reel such as the reel 40 rotatably mounted on the spindle 36. The free end of the blade is provided with a hook 42 as shown in FIG. 1 to facilitate its movement to a desired extended position and the measurement of a workpiece. Additionally, a suitable locking mechanism including a thumb actuated slide 44 may also be provided for retaining the measuring blade 18 in a desired extended position. For example, the locking mechanism described in greater detail in U.S. Pat. No. 3,214,836 may be effectively used for this purpose.

In coilable power rules of the type described, the coiling of the tape and the spring is partially impeded by the frictional engagement of the reel or the blade and the spring against the side walls of the casing. However, in long measuring tapes of substantial size that employ powerful, heavy duty power springs, this frictional drag is negligible and does not substantially impede the recoil speed of the blade once it is released for retraction or recoil into the casing chamber. Additionally, this high speed recoil tends to generate lateral flutter of the tape measure during the recoil operation causing substantial wear on the rule and premature reduction in its useful work life.

In accordance with the present invention there is provided a self-regulating speed control which provides the additional beneficial feature of maintaining the tape in an aligned condition during the recoil operation. In the particular embodiment illustrated, the rotatable reel 40 housed within the chamber 16 includes a pair of molded plastic disc-like side members 50,52 rotatably mounted on the enlarged end portions 38 of central spindle 36. Each reel side member is provided with a plurality of reinforcing radial ribs 46 extending from a central hub 48 on the exterior thereof and a pair of circumferentially spaced arcuate flanges 54 disposed about 180° apart and laterally extending so as to cooperatively interfit within a corresponding slot 56 in the opposite side member. The ribs 46 terminate in an integral exterior ring 58 located adjacent slots 56. Thus the two side members 50,52 and their respective flanges 54 are cooperatively assembled with each other to maintain the spaced apart relationship of the disc-like side members and to assure their rotation in close confronting relation with the side walls 12,14 of the casing.

Annular shoulders 60,62 project inwardly from casing side walls 12 and 14 respectively and confineably engage and align the side members 50,52 of the reel so as to prevent undesirable wobble during the rotation thereof. The shoulders 60,62 are positioned so as to contact the reel immediately adjacent the outer rim of each side member to most effectively limit transverse movement of the reel within the chamber 16.

One reel side member 52 is further provided with a pair of diametrically opposed pivot posts 64 adjacent but spaced from the outer rim radially inwardly of casing shoulder 62 and extending laterally outwardly from the ribs 46 toward the confronting side wall 14 of the casing. The inwardly projecting aligning shoulder 62 that is positioned so as to contact the reel side member 52 intermediate the rim and the ring 58 is provided with an arcuate brake drum surface 66 facing generally inwardly toward the stud 32 and pivot posts 64.

A pair of speed control segments or lugs 70 are pivotably mounted on the pivot posts 64. The lugs 70 are planar weighted masses of metal or similar material and are of an elongated dog-leg configuration with the pivot point located adjacent one end thereof. The speed control lugs 70 rest against the ribs 46 and ring 58 and are mounted for free rotation about the pivot posts 64 but, as shown, are of sufficient length so that the free end 72 thereof will engage the truncated stud 32 on the casing side wall 14 thereby restricting their pivotal movement. The lugs 70 are substantially identical and extend from the pivot pin generally in a direction opposite to the direction of travel of the blade 18 during recoil. Each lug includes an arcuate braking edge surface 74 substantially conforming to the arcuate brake drum surface 66 of the shoulder 62. This brake edge surface 74 is located immediately adjacent the pivot posts 64 and extends along approximately one half the length of the speed control lug 70. The remaining trailing portion of the lug terminating in free end 72 is disposed at an angle to the braking surface and extends radially inwardly therefrom. Since this trailing portion constitutes a substantial portion of the mass of the speed control lug, it produces a second class lever effect and provides a mechanical advantage when the braking surface 74 of the lug is thrust against the brake drum surface 66 by the centrifugal force applied to the reel during recoil under the influence of the power drive spring 20.

As will be appreciated from the foregoing detailed description, the speed control incorporated within the tape measuring device is operative primarily upon the application of a high speed rotary force to the reel by the power drive spring. The speed control lugs pivotably connected at one end only are readily subject to centrifugal force resulting from the high rotational speed of the reel's disc-like side members and are thrown outwardly by the centrifugal force so as to bring the braking edge surface thereof into frictional braking engagement with the arcuate drum surface provided by the inwardly projecting annular shoulder extending from the side wall of the casing. The dog-leg configuration of the speed control lugs positions the center of mass thereof at a point well removed from the pivot post and permits the trailing portion of the lug to apply additional leverage to the braking surface so as to provide a mechanical advantage to the speed control lug. As will be appreciated, the lugs will bear against the brake drum surface in proportion to the speed of the reel and therefore will provide a self-regulating influence over the recoil speed of the blade as it is retracted into its recoiled position within the casing chamber. The number and size of the lugs may, of course, vary depending on other design and structural features of the device.

As will be apparent to persons skilled in the art, various modifications, adaptations and variations of the foregoing specific disclosure can be made without departing from the teaching of the present invention.

I claim:

1. A tape measuring device adapted for self-regulating the recoil speed thereof comprising a casing including spaced apart side walls defining a chamber, a reel rotatably journaled within the chamber, a coiled measuring tape counted on the reel for rotation in a first rotatable direction as the tape is withdrawn from the casing and a power drive spring mounted within the chamber for driving the measuring tape in a reverse direction from said first rotatable direction into a recoiled position within the chamber, said reel including a pair of spaced apart side members in close confronting relationship with the casing side walls, said side members having an outer peripheral rim, one of said side members carrying a pivot adjacent but spaced from the peripheral rim, the casing wall confronting said pivot having an annular shoulder extending toward said reel intermediate the peripheral rim and the pivot, said annular shoulder engaging the confronting side member of the reel to alignably confine said reel within the chamber and limit transverse movement of said reel, said shoulder including an arcuate brake drum surface generally facing toward said pivot, said reel being provided with a planar weighted mass pivotably mounted on the side member at said pivot between the side member and the confronting casing wall for frictionally engaging the brake drum surface of said shoulder and bearing thereagainst in proportion to the centrifugal force applied to the reel by the power drive spring when driving the measuring tape into its recoiled position.

2. The tape measuring device of claim 1 wherein said one reel side member carries a plurality of equally spaced pivots and a weighted mass is mounted on each pivot for frictionally engaging said brake drum surface.

3. The tape measuring device of claim 1 wherein the reel side members are disc-like members and the weighted mass is an elongated lug pivotably mounted at one end and extending from the pivot in said first rotatable direction.

4. The tape measuring device of claim 1 wherein the weighted mass is an elongated lug of dog-leg configuration connected to the pivot at one end and having an edge surface adjacent the pivot frictionally engaging said brake drum surface and a substantial trailing portion disposed at an angle to said edge surface and extending radially inwardly therefrom.

* * * * *